(12) United States Patent
Rousselet et al.

(10) Patent No.: US 12,462,953 B2
(45) Date of Patent: Nov. 4, 2025

(54) POWER CABLE EQUIPPED WITH AN ELECTRONIC DEVICE FOR RADIOFREQUENCY IDENTIFICATION

(71) Applicant: NEXANS, Courbevoie (FR)

(72) Inventors: Nicolas Rousselet, Saint-Genis-Laval (FR); Cédric Lumpp, Boulogne-Billancourt (FR); Larry Drayton Land, El Dorado, AR (US); Anthony Raines, Lillie, LA (US); Aymeric Andre, Antibes (FR); Frédérique Kalb, Boncourt (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/940,981

(22) Filed: Jul. 28, 2020

(65) Prior Publication Data

US 2021/0110950 A1    Apr. 15, 2021

(30) Foreign Application Priority Data

Aug. 2, 2019  (FR) ...................... 19 08882
Aug. 6, 2019  (FR) ...................... 19 09008

(51) Int. Cl.
*H01B 9/00* (2006.01)
*H01B 7/00* (2006.01)

(52) U.S. Cl.
CPC ............ *H01B 9/003* (2013.01); *H01B 9/006* (2013.01)

(58) Field of Classification Search
CPC .......... G02B 6/447; G06K 7/10; G06K 19/00; H01B 7/36; H01B 7/366; H01B 7/368; H01B 7/00; H01B 9/003; H01B 9/006; H01B 9/00; H01B 13/345; H01B 13/34; H01B 7/041; G01V 15/00
USPC ............................................ 174/113 R, 70 R
See application file for complete search history.

(56) References Cited

U.S. PATENT DOCUMENTS

| 5,706,382 A | * | 1/1998 | Smith ................. H01B 7/183 385/103 |
| 8,150,227 B2 | | 4/2012 | Kewitsch |
| 2004/0184747 A1 | | 9/2004 | Koyasu et al. |
| 2014/0210633 A1 | * | 7/2014 | Hrametz ............... E21B 23/02 340/854.4 |
| 2015/0214746 A1 | * | 7/2015 | Lopez Gomez ..... H01B 7/0275 29/605 |

(Continued)

FOREIGN PATENT DOCUMENTS

| CN | 208 921 045 | 5/2019 |
| GB | 2354600 | 3/2001 |

(Continued)

OTHER PUBLICATIONS

International Search Report dated Mar. 18, 2020.

*Primary Examiner* — Timothy J Thompson
*Assistant Examiner* — Guillermo J Egoavil
(74) *Attorney, Agent, or Firm* — MUNCY, GEISSLER, OLDS & LOWE, P.C.

(57) ABSTRACT

A power cable (10) includes at least one electrical conductor (12) and at least one interstice (14) in the vicinity of the electrical conductor (12). The cable (10) further has at least one electronic device (18) for radiofrequency identification and at least one tube (16) arranged in the at least one interstice (14) and containing the electronic device (18) for radiofrequency identification.

8 Claims, 1 Drawing Sheet

(56) References Cited

U.S. PATENT DOCUMENTS

2019/0304628 A1\* 10/2019 Neumann .............. H01B 7/366
2020/0089923 A1\* 3/2020 Arsenault .......... G06K 7/10366

FOREIGN PATENT DOCUMENTS

JP    2004265624 A * 9/2004 ............. G02B 6/447
WO    2004072989      8/2004

\* cited by examiner

POWER CABLE EQUIPPED WITH AN ELECTRONIC DEVICE FOR RADIOFREQUENCY IDENTIFICATION

RELATED APPLICATION

This application claims the benefit of priority from French Patent Application Nos. 19 08882 filed on Aug. 2, 2019 and No. 19 09008, filed on Aug. 6, 2019, the entirety of which are incorporated by reference.

FIELD OF THE INVENTION

The present invention relates to a power cable equipped with an electronic device for radiofrequency identification.

The invention relates to the field of electrical power cables.

DESCRIPTION OF RELATED ART

In some applications, electrical power cables are mobile during operation and therefore experience bending and/or twisting movements and/or any other mechanical stress. This is the case, for example, for cables in the mining sector used in machines such as shovels or draglines.

Additionally, it may be useful to have electronic devices for radiofrequency identification, or RFID, on or in these cables. Such devices make it possible for example to identify cables and may store and transmit other useful information.

These electronic devices include relatively fragile electronic components, which are liable to be damaged by the mechanical stresses mentioned above, to the extent of no longer operating correctly.

OBJECTS AND SUMMARY

The object of the present invention is to overcome the aforementioned drawbacks of the prior art.

To this end, the present invention provides a power cable comprising at least one electrical conductor and at least one interstice in the vicinity of this electrical conductor, the cable further comprising at least one electronic device for radiofrequency identification, the cable being noteworthy in that it further comprises at least one tube arranged in the at least one interstice and containing the electronic device for radiofrequency identification.

Thus, the device for radiofrequency identification, or RFID, arranged inside the tube, is protected from the mechanical stresses caused by the twisting or bending of the cable. In addition, transmission and reception by the RFID device are improved due to the presence of the tube, which increases the distance between the RFID device and the one or more electrical conductors contained in the cable and close to which the tube is located.

In one particular embodiment, the cable further comprises at least one support cord arranged in the tube and freely mobile inside the tube.

The support cord facilitates the installation and removal of the RFID device while preventing it from moving in an uncontrolled manner inside the tube.

In one particular embodiment, the at least one RFID device is arranged on the at least one support cord.

This confers a certain degree of freedom on the RFID device, which is therefore better able to withstand the mechanical tension.

In one particular embodiment, the tube has an inner diameter such that the area of the cross section of the electronic device for radiofrequency identification represents a third of the area of the inner cross section of the tube.

This ratio of the dimensions of the RFID device to those of the inside of the tube makes it possible to ensure sufficient freedom of movement for the RFID device inside the tube.

In one particular embodiment, the length of the at least one support cord is greater, by less than 10%, than the length of the at least one tube.

This extra length contributes to better control of the mobility of the support cord, and therefore of the RFID device, inside the tube.

In one particular embodiment, the at least one tube has a smooth inner wall. This ensures that neither the support cord nor the RFID device will get caught on the inner wall of the tube.

In this particular embodiment, the tube may be made by extrusion.

In one particular embodiment, in which the cable comprises a plurality of electrical conductors and a plurality of interstices between the conductors of the plurality of electrical conductors, the cable comprises a plurality of tubes arranged in the plurality of interstices, each of the tubes containing at least one electronic device for radiofrequency identification.

In one particular embodiment, the at least one electronic device for radiofrequency identification comprises at least one chip and at least one communication antenna.

In one particular embodiment, the cable is a mining cable.

BRIEF DESCRIPTION OF THE DRAWINGS

Other features and advantages of the invention will become apparent upon reading the detailed description below of particular embodiments, provided by way of completely non-limiting examples and with reference to the appended drawings, in which.

DETAILED DESCRIPTION

Figure 1:
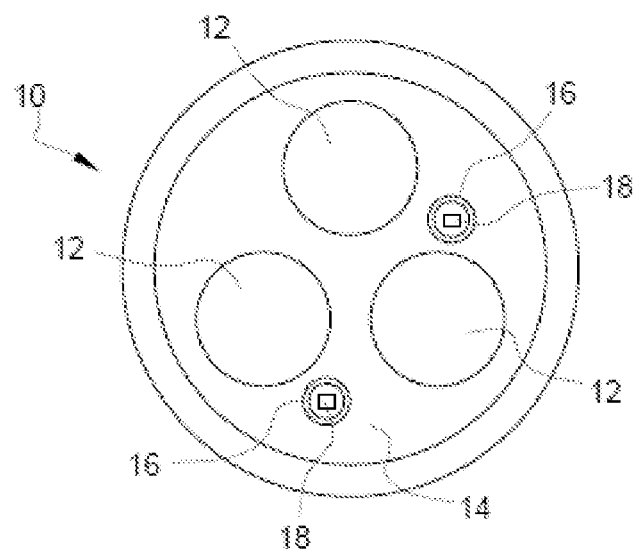
FIG. 1 is a schematic view in cross section of a power cable according to the present invention, in one particular embodiment.

As shown in FIG. 1, a power cable 10 according to the present invention comprises at least one electrical conductor 12. In the particular embodiment illustrated, the power cable 10 comprises three electrical conductors 12.

By way of non-limiting example, the power cable 10 may be a mining cable.

The power cable 10 comprises at least one interstice 14. The interstices 14 are located inside the cable, in the vicinity of the one or more electrical conductors 12, and correspond to the inner volume of the power cable 10 which is still free once all of the components of the power cable 10 have been assembled together.

The power cable 10 further comprises at least one tube 16 arranged in the interstice 14 or one of the interstices 14. In the particular embodiment illustrated, the tube 16 is arranged in the interstice 14 formed between two of the three electrical conductors 12.

The power cable 10 further comprises at least one electronic device 18 for radiofrequency identification, or RFID device.

The RFID device 18 comprises for example at least one electronic chip and at least one communication antenna, the chip and the antenna being assembled together for example by coating in a resin.

According to the invention, the RFID device 18 is contained in the tube 16.

The tube 16 may for example by made by extrusion. Its inner surface is sufficiently smooth to allow the support cord 20 and the RFID device 18 to be mobile without them catching on this wall.

The tube 16 may be made in an insulating material, for example of polyamide.

Figure 2:
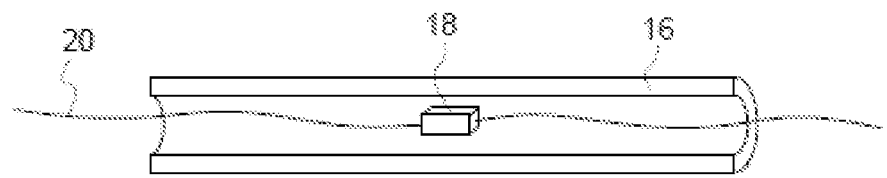
FIG. 2 is a view in longitudinal section of a portion of a tube containing an electronic device for radiofrequency identification, this tube being included within a power cable according to the present invention, in one particular embodiment.

As shown in FIG. 2, the power cable 10 further comprises at least one support cord 20 arranged in the tube 16 and on which the RFID device 18 is arranged.

Preferably, the tube 16 does not contain any solid or liquid which could hamper the mobility of the support cord 20 inside tube 16. The tube 16 is preferably filled with a gas such as air.

To ensure continuity of the support cord 20 and to strengthen its mechanical properties, the support cord 20 may be made of a non-conductive textile thread with high mechanical strength or high elasticity, comprising a central core consisting of a material exhibiting high longitudinal tensile strength such as for example polyamide 6-6 or Vectran (registered trademark).

The RFID device 18 is attached to the support cord 20 for example by wrapping. In order to ensure the cohesion of the assembly, two layers of wrapping may be provided, the assembly pitches being opposite. The coating could consist, inter alia, of polyamide or elastane.

The support cord 20 is freely mobile inside the tube 16, since it is attached only at the ends of the tube 16 without experiencing mechanical tension. Thus, the RFID device 18 is also freely mobile inside the tube 16, inasmuch as it is connected to the support cord 20.

To ensure satisfactory freedom of movement, the tube 16 has an inner cross section such that the area of the cross section of the RFID device 18 represents, for example, a third of the area of the inner cross section of the tube 16. However, the inner diameter of the tube 16 is sufficiently small with respect to the size of the RFID device 18 so as to allow only longitudinal movements of the support cord 20, preventing in particular knots therein.

Additionally, the length of the support cord 20 is greater, by less than 10%, than the length of the tube 16.

The outer diameter of the tube 16 is of course chosen such that the tube 16 is inserted correctly into the interstice 14 envisaged for receiving it.

The embodiment of FIG. 1 shows a power cable 10 with a plurality of conductors 12, which is equipped with a single tube 16 that contains a single RFID device 18. As a variant, the power cable 10 could include a plurality of tubes 16 arranged in one or more interstices 14 of the cable 10 that are located between the conductors 12, each of the tubes 16 containing one or more RFID devices 18 arranged on one or more support cords 20.

The invention claimed is:

1. A power cable comprising:
   at least one electrical conductor and at least one interstice in the vicinity of said electrical conductor, said cable further comprising at least one electronic device for radiofrequency identification, wherein at least one tube arranged in said at least one interstice and containing said electronic device for radiofrequency identification,
   wherein said power cable further comprising at least one support cord arranged in said tube and freely mobile inside said tube, and
   wherein the length of said at least one support cord is greater, by less than 10%, than the length of said at least one tube.

2. The cable according to claim 1, wherein said at least one electronic device for radiofrequency identification is arranged on said at least one support cord.

3. The cable according to claim 1, wherein said tube has an inner diameter such that the area of the cross section of said electronic device for radiofrequency identification represents a third of the area of the inner cross section of said tube.

4. The cable according to claim 1, wherein said at least one tube has a smooth inner wall.

5. The cable according to claim 4, wherein said tube is made by extrusion.

6. The cable according to claim 1, further comprising a plurality of electrical conductors and a plurality of interstices between the conductors of said plurality of electrical conductors, wherein said cable further comprises a plurality of tubes arranged in said plurality of interstices, each of said tubes containing at least one electronic device for radiofrequency identification.

7. The cable according to claim 1, wherein said at least one electronic device for radiofrequency identification comprises at least one chip and at least one communication antenna.

8. The cable according to claim 1, wherein said cable is a mining cable.

\* \* \* \* \*